(12) United States Patent
Kambe et al.

(10) Patent No.: US 7,090,410 B2
(45) Date of Patent: Aug. 15, 2006

(54) OPTICAL RECEPTACLE WITH LOW TRANSMISSION LOSS AND PHOTOELECTRIC CONVERSION MODULE FOR THE SAME

(75) Inventors: Yoshiaki Kambe, Nara (JP); Kenichi Shimaya, Hirakata (JP); Tsutomu Shimomura, Toyonaka (JP); Albrecht Haack, Wuppertal (DE); Paul Gerhard Halbach, Wuppertal (DE); Markus Gaertner, Remscheid (DE)

(73) Assignees: Matsushita Electric Works, Ltd., Osaka (JP); Delphi Technologies Inc., Troy, MI (US)

( * ) Notice: Subject to any disclaimer, the term of this patent is extended or adjusted under 35 U.S.C. 154(b) by 0 days.

(21) Appl. No.: 10/528,652

(22) PCT Filed: Sep. 29, 2003

(86) PCT No.: PCT/JP03/12388

§ 371 (c)(1),
(2), (4) Date: Mar. 22, 2005

(87) PCT Pub. No.: WO2004/031817

PCT Pub. Date: Apr. 15, 2004

(65) Prior Publication Data

US 2006/0045435 A1    Mar. 2, 2006

(30) Foreign Application Priority Data

Sep. 30, 2002   (JP) ............................. 2002-287413

(51) Int. Cl.
G02B 6/36 (2006.01)

(52) U.S. Cl. ............................. 385/88; 385/92; 385/93

(58) Field of Classification Search ............. 385/88–94
See application file for complete search history.

(56) References Cited

U.S. PATENT DOCUMENTS

| 4,737,008 A | 4/1988 | Ohyama et al. |
|---|---|---|
| 5,224,186 A | 6/1993 | Kishimoto et al. |
| 5,259,053 A | 11/1993 | Schaffer et al. |
| 5,475,783 A | 12/1995 | Kurashima |

(Continued)

FOREIGN PATENT DOCUMENTS

EP    0 009 330 A1    4/1980

(Continued)

OTHER PUBLICATIONS

PCT International Search Report for PCT/JP2003/12388 mailed on May 6, 2004.

*Primary Examiner*—Phan Palmer
(74) *Attorney, Agent, or Firm*—Rader, Fishman & Grauer PLLC

(57) ABSTRACT

An optical receptacle with low transmission loss, which is connectable with an optical plug, is provided. The optical receptacle includes a photoelectric conversion module having the capability of making photoelectric conversion between light signals and electrical signals, and a module housing. The photoelectric conversion module is a molded interconnect device (MID), which is provided with a module body having a post, an optical device mounted on the post, and an electrical circuit mounted on the module body. The module housing has a tubular projection, into which an end of the optical fiber supported by the optical plug can be inserted. When the optical plug is connected with an optical receptacle, the end of the optical fiber is positioned in the tubular projection so as to be in a closely opposing relation to the optical device mounted on the post.

13 Claims, 12 Drawing Sheets

U.S. PATENT DOCUMENTS

| | | |
|---|---|---|
| 5,633,971 A | 5/1997 | Kurashima |
| 6,113,280 A | 9/2000 | Nagaoka et al. |
| 6,126,325 A * | 10/2000 | Yamane et al. ............... 385/92 |
| 2002/0102073 A1 | 8/2002 | Shirakawa |

FOREIGN PATENT DOCUMENTS

| | | |
|---|---|---|
| EP | 0 320 214 A2 | 6/1989 |
| JP | 2001-013367 A1 | 1/2001 |

* cited by examiner

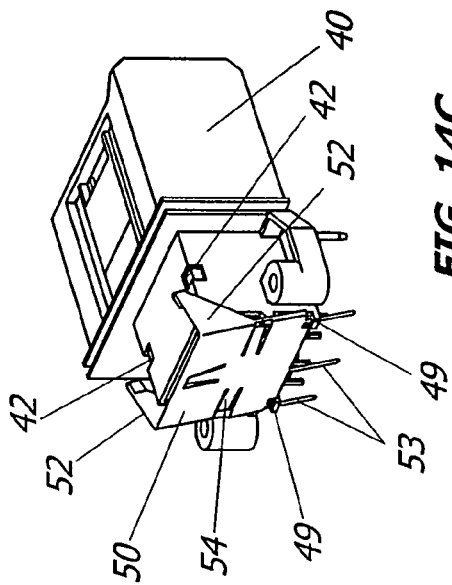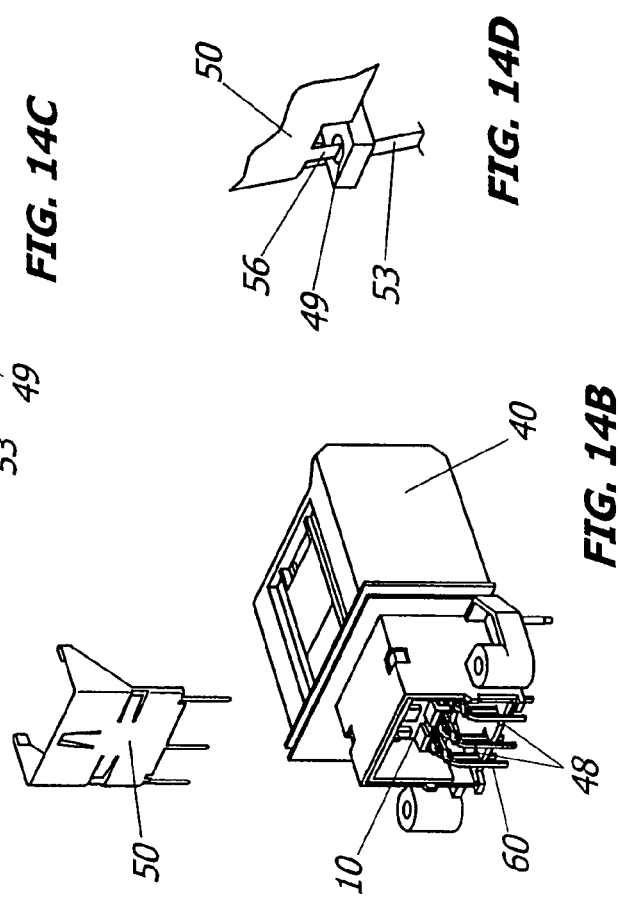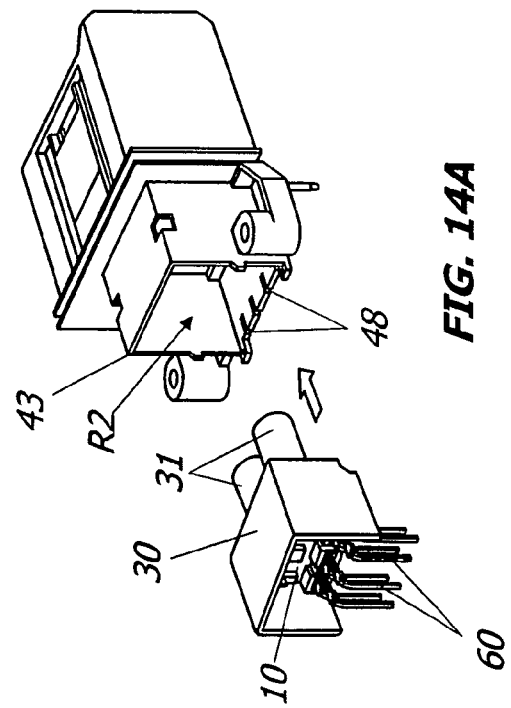
FIG. 14A
FIG. 14B
FIG. 14C
FIG. 14D

US 7,090,410 B2

OPTICAL RECEPTACLE WITH LOW TRANSMISSION LOSS AND PHOTOELECTRIC CONVERSION MODULE FOR THE SAME

TECHNICAL FIELD

The present invention relates to an optical receptacle connectable with an optical plug having a light transmitting medium such as an optical fiber, and a photoelectric conversion module for the optical receptacle, which has the capability of making photoelectric conversion between light signals transmitted through the optical transmission medium and electrical signals.

BACKGROUND ART

Worldwide developments of high-speed communication system preferably used for transport means such as automobiles, airplanes, trains and shipping are now underway. For example, "MOST®" (Media Oriented System Transport) has been proposed as an optical communication standard in Europe.

FIG. 18 shows a conventional optical connector designed under the "MOST®" standard ("TYCO Electronics & MOST" in Presentations by MOST members on "All Members Meeting Apr. 3, 2001"). This connector is composed of an optical receptacle 1P built in an electronic equipment such as CD, DVD, GPS that can be used in the transport means, and an optical plug 2P for supporting a pair of plastic optical fibers (POF) 100. For example, when the optical plug 2 is connected to the optical receptacle 1, a data communication between the electronic equipment and a data base connected through the optical fibers becomes available in the transport means.

The optical receptacle 1 can be mounted on a circuit board in the electronic equipment, and is mainly composed of a pair of photoelectric conversion modules 10P having the capability of making photoelectric conversion between light signals transmitted through the optical fibers 100 and electrical signals used in the electronic equipment, a shield case 50P made of a metal material for accommodating the photoelectric conversion modules, a pair of optical couplers 200 such as optical-fiber members having a required length, each of which is placed between an optical device of the photoelectric conversion module 10P and an end of the optical fiber 100 supported by the optical plug 2P, optical-fiber housing 80 for accommodating these optical couplers therein, and a receptacle housing 40P for providing a space for making the connection between the optical plug 2P and the optical coupler 200.

One of the photoelectric conversion modules 10P has the capability of converting the optical signals transmitted through the optical fiber 100 to the electric signals, and the other one has the capability of converting the electric signals provided from the electronic equipment to the optical signals to be supplied to the optical fiber. As shown in FIG. 19, each of the photoelectric conversion modules 10P is provided with an optical device 12P such as light-emitting diode and light-receiving diode, and an electric circuit 14P electrically connected to the optical device by a lead wire 16P. After the optical device 12P and the electric circuit 14P are mounted on a single lead frame 90, they are integrally molded with a translucent resin 11P to obtain a resin molded article 95 having a substantially rectangular solid shape. When the optical plug 2P is connected to the optical receptacle 1P, the optical signals provided from the optical fibers 100 of the optical plug are transmitted to the optical devices 12P of the photoelectric conversion modules 10P through the optical couplers 200.

In addition, Japanese Patent Early Publication [kokai] No. 2001-13367 discloses an optical receptacle, as shown in FIG. 20. This optical receptacle is provided with a receptacle housing 40E having a front opening 41E, into which an optical plug (not shown) can be fitted, optical device modules 10E, a pair of sleeves 85 that are useful to improve production efficiency of the optical receptacle, and a cap 50E. The receptacle housing also has a rear opening 43E, through which the optical device modules 10E and the sleeves 85 are accommodated in the receptacle housing 40E.

The optical device modules 10E and the sleeves 85 are placed in the receptacle housing 40E such that when the optical plug is connected to the optical receptacle 1E, each of the top ends of the optical fibers supported by the optical plug is positioned in an opposing relation with the corresponding optical device module 10E through the sleeve 85. The sleeve 85 is composed of an optical waveguide portion made of glass or synthetic resin, and a cylindrical holder portion made of a metal material. Alternatively, an additional optical fiber having a required length may be used as the sleeve 85.

According to this optical receptacle, since the optical device module 10E is smoothly fitted in the receptacle housing 40E by use of the sleeve 85, it is possible to prevent the optical device module 10E from being inserted in an oblique direction into the receptacle housing, and also from a breakage caused by an accidental interference with the receptacle housing. Therefore, there is an advantage that production efficiency and yield of the optical receptacle are improved, as compared with conventional cases.

However, in the conventional optical receptacles described above, since the optical couplers 200 such as the optical-fiber members having the required length or the sleeves 85 are disposed between the top ends of the optical fibers supported by the optical plug and the optical devices of the optical receptacle, an increase in transmission loss of the optical signals comes into a problem. In addition, there is another problem of increasing total component counts of the optical receptacle.

SUMMARY OF THE INVENTION

In consideration of the above-described problems, the present invention provides an optical receptacle with low transmission loss, which is connectable with an optical plug having an optical transmission medium not through an additional transmission medium such as sleeve or an additional optical fiber.

That is, the optical receptacle of the present invention comprises a photoelectric conversion module having the capability of making photoelectric conversion between light signals transmitted through the optical transmission medium and electrical signals, and a module housing for accommodating the photoelectric conversion module therein. The module housing is formed with a tubular projection, into which one end of the optical transmission medium can be inserted. The photoelectric conversion module comprises an optical device disposed in a closely opposing relation to the one end of the optical transmission medium in the tubular projection when the optical plug is connected with the optical receptacle, and an electrical circuit electrically connected to the optical device. For example, the optical device may be at least one of a light emitting element and a light receiving element.

According to the present invention, since the optical device of the optical receptacle is disposed in a closely opposing relation to the one end of the optical transmission medium supported by the optical plug in the tubular projection without using the additional optical fiber or the sleeve, it is possible to conduct optical data communications between the optical transmission medium and the optical device with a reduced transmission loss.

It is preferred that module housing has the tubular projection integrally formed on its front surface, a rear opening, through which the photoelectric conversion module is accommodated in the module housing, and a shield layer formed on its exterior surface. In this case, by the formation of the shield layer on the exterior surface of the module housing, it is possible to reduce component counts, downsize the optical receptacle as whole, and also improve resistance to noise.

It is also preferred that the photoelectric conversion module comprises a module body having a post, on a top of which the optical device is mounted, and the electric circuit is mounted on the module body. In particular, it is preferred that the post is formed in its top with a recess for mounting the optical device on a bottom of the recess, and a reflection layer for preventing a scattering of light is formed on a sidewall in the recess. In this case, since the reflection layer effectively prevents the scattering of light, it is possible to further reduce the transmission loss.

It is further preferred that the module housing has a stopper formed in the tubular projection, against which the one end of the optical transmission medium abuts when the optical plug is connected with the optical receptacle. In this case, it is possible to minimize variations in distance (gap) between the optical device and the optical transmitting medium, and stably provide a constant optical coupling efficiency therebetween.

Moreover, it is preferred that a lens is positioned between the optical device and the one end of the optical transmission medium when the optical plug is connected with the optical receptacle. In this case, the lens can improve the optical coupling efficiency therebetween. In addition, even when the distance (gap) between the optical device and the optical transmission medium accidentally increases, it is possible to minimize fluctuations of transmission loss.

In addition, it is preferred that the photoelectric conversion module is a molded interconnect device (MID) that a wiring for making electrical connection between the optical device and the electrical circuit is formed along an exterior surface of the module body. In this case, it is possible to reduce component counts, shorten assembly times, and achieve downsizing and light-weighting of the photoelectric conversion module.

As a particularly preferred embodiment of the present invention, the optical receptacle comprises a photoelectric conversion module having the capability of making photoelectric conversion between light signals transmitted through the optical transmission medium and electrical signals, and a module housing for accommodating the photoelectric conversion module therein. The photoelectric conversion module comprises a module body having a post, an optical device mounted on a top of the post, and an electrical circuit mounted on the module body and electrically connected to the optical device. The module housing has a tubular projection, into which one end of the optical transmission medium can be inserted, and a partition wall is formed in the tubular projection. The photoelectric conversion module is accommodated in the module housing such that the post is positioned at a side of said partition wall in the tubular projection. When the optical plug is connected with the optical receptacle, the one end of the optical transmission medium is positioned at the opposite side of the partition wall in the tubular projection so as to be in a closely opposing relation to the optical device mounted on the post.

According to this optical receptacle of the present invention, it is possible to provide the following advantage in addition to the above-described advantage of reducing the transmission loss. That is, when the optical plug is connected to the optical receptacle, the optical transmission medium supported by the optical plug can be inserted into the tubular projection such that the top end of the optical transmission medium abuts against the partition wall. In other words, the partition wall functions as a stopper for the optical transmission medium. Therefore, it is possible to minimize variations in distance (gap) between the optical device and the optical transmitting medium, and stably provide a constant optical coupling efficiency therebetween.

As a further preferred embodiment of the present invention, the optical receptacle comprises a receptacle housing for accommodating the module housing therein, which is used for connection with the optical plug, and has a front opening, through which the optical plug can be inserted into a plug accommodation space defined in the receptacle housing, a rear opening, through which the photoelectric conversion module is accommodated in the receptacle housing such that the tubular projection of the module housing projects in the plug accommodation space, and the rear opening is closed by an electromagnetic interference shielding member. In particular, when the photoelectric conversion module is prevented from the electromagnetic interference by the shielding member in cooperation with the above-described shield layer formed on the exterior surface of module housing, it is possible to provide excellent resistance to noise.

A further concern of the present invention is to provide a photoelectric conversion module for the optical receptacle with low transmission loss, which is connectable with an optical plug having an optical transmission medium not through an additional transmission medium. That is, the photoelectric conversion module has the capability of making photoelectric conversion between light signals transmitted through the optical transmission medium and electrical signals, and comprises a module body having a post, an optical device mounted on a top of the post, and an electrical circuit mounted on the module body and electrically connected to the optical device. The photoelectric conversion module is a molded interconnect device (MID) that a wiring for making the electrical connection between the optical device and the electrical circuit is formed along an exterior surface of said module body. The optical device mounted on the post is disposed in a closely opposing relation to one end of the optical transmission medium when the optical plug is connected with the optical receptacle.

Since the photoelectric conversion module of the present invention is the molded interconnect device (MID), which is characterized in that the electrical circuit and the optical device are mounted on the module body, e.g., a three-dimensional molded resin article, and the electric circuit is electrically connected to the optical device by the wiring pattern three-dimensionally formed along the exterior of the module body, it is possible to reduce component counts, and shorten assembly times. In-addition, by enabling higher mounting density, it is possible to achieve downsizing and light-weighting of the photoelectric conversion module, and therefore reduce size of the optical receptacle.

These and still other objects and advantages of the present invention will become more apparent from the best mode for carrying out the invention explained below, referring to the attached drawings.

BRIEF EXPLANATION OF DRAWINGS

FIGS. 14A to 14D are perspective views illustrating a method of attaching the shielding member to the receptacle housing;

BEST MODE FOR CARRYING OUT THE INVENTION

An optical receptacle according to a preferred embodiment of the present invention is explained in detail below.

<First Embodiment>

Figure 1:
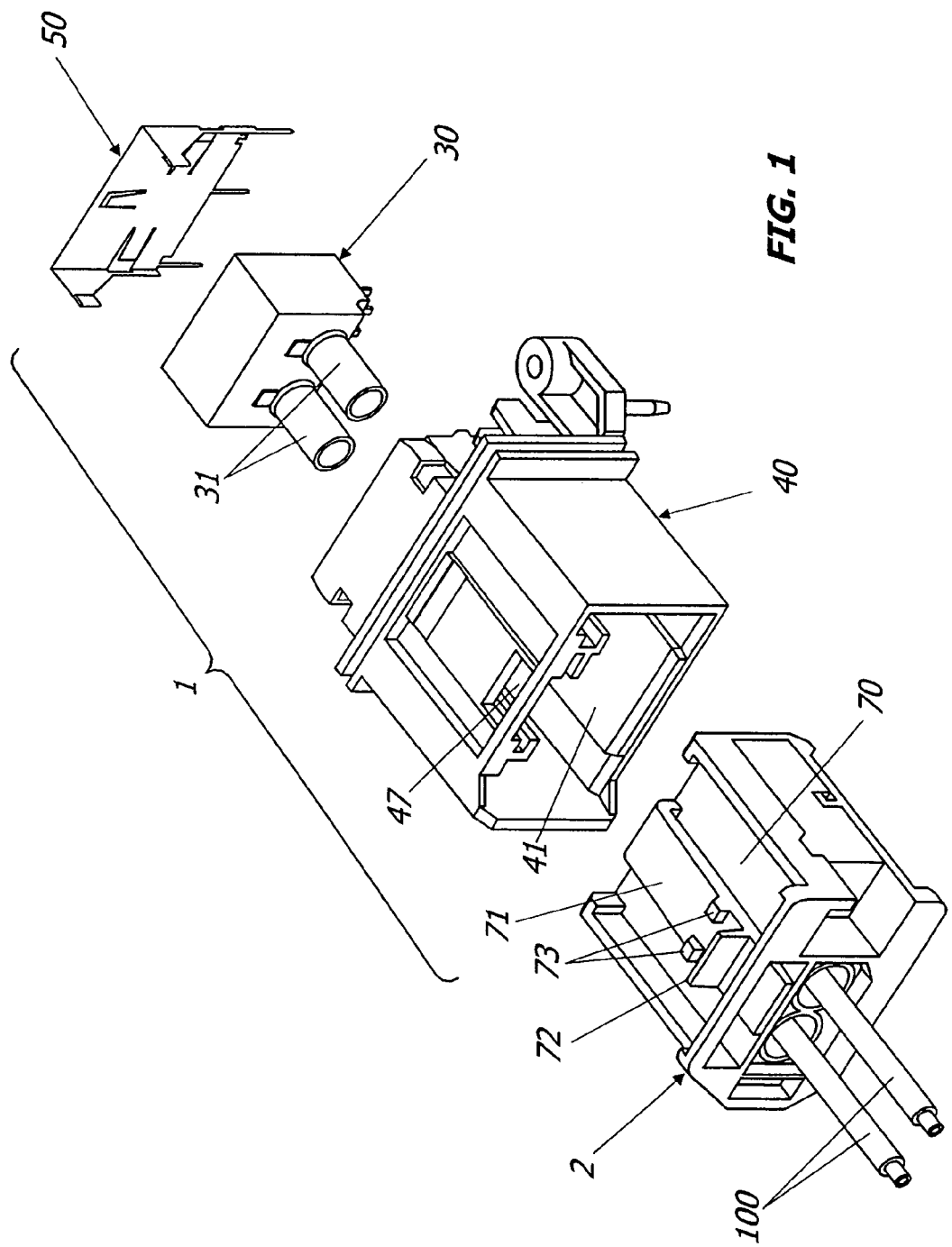
FIG. 1 is an exploded perspective view of an optical receptacle according to a preferred embodiment of the present invention.

As shown in FIG. 1, the optical receptacle 1 of this embodiment is connectable with an optical plug 2 supporting one ends of a pair of plastic optical fibers (POF) 110 as an optical transmission medium, and preferably used for data communication between a data base connected through the other ends of the optical fibers 110 and an on-board electric equipment such as CD, DVD, GPS and car telephone.

Figure 2:
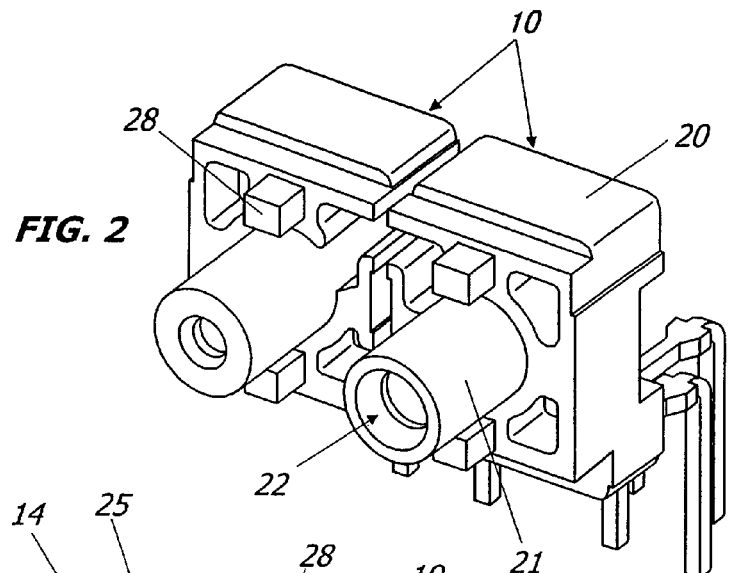
FIG. 2 is a perspective view of photoelectric conversion modules of the optical receptacle.

As shown in FIGS. 1 and 2, the optical receptacle 1 is mainly composed of a pair of photoelectric conversion modules 10 each having the capability of making photoelectric conversion between light signals transmitted through the optical fibers 100 and electrical signals used in the electrical equipment, a module housing 30 of a resin molded article for accommodating the photoelectric conversion modules 10 therein, a receptacle housing 40 for accommodating the module housing 30 therein, and an electromagnetic interference shielding member 50 made of a metal material.

The photoelectric conversion module 10 can be mounted on a circuit board built in the electric equipment. One of the photoelectric conversion modules 10 is a first photoelectric conversion module with an optical device such as a light-receiving diode (PD), which has the capability of converting received light signals into electrical signals. The other one is a second photoelectric conversion module with another optical device such as a light-emitting diode (LED), which has the capability of converting electrical signals into light signals and projecting the light signals to the optical fiber 100.

Figure 3:
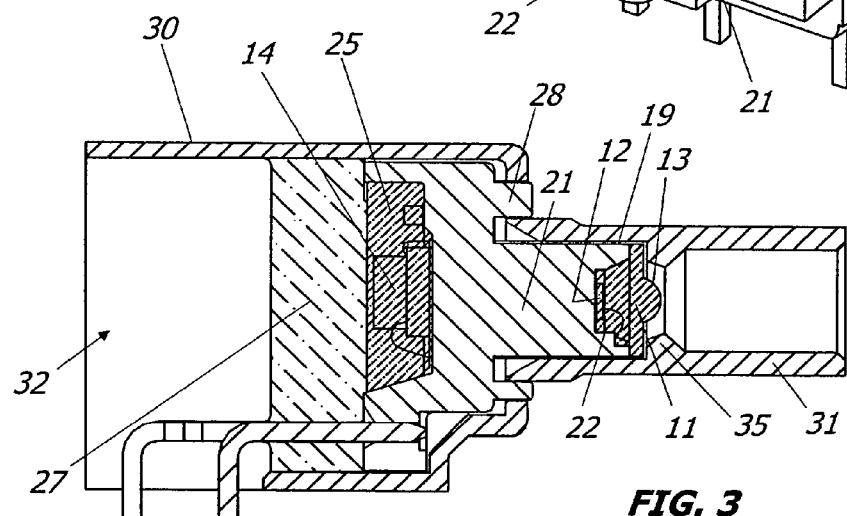
FIG. 3 is a cross-sectional view of the photoelectric conversion module accommodated in a module housing.

As shown in FIGS. 2 and 3, each of the photoelectric conversion modules 10 comprises a module body 20 having a column-shaped post 21, the above-described optical device 12 attached to a top of the post, and an electrical circuit 14 mounted on the module body and electrically connected to the optical device. For example, the module body 20 may be configured in a substantially rectangular solid. The post 21 is integrally formed on a front surface of the module body 20. The post 21 is formed in its top with a recess 22 for mounting the optical device on a bottom of the recess.

The optical device 12 mounted in the recess 22 is sealed with a translucent resin 11. The translucent resin is molded in a shape of convex lens 13. That is, the convex lens 13 for the first photoelectric conversion module is formed such that light provided from the optical fiber 100 is focused on a light receiving surface of the optical device 12 by the convex lens 13. On the other hand, the convex lens 13 for the second photoelectric conversion module is formed such that light provided from the light-emitting diode (LED) of the optical device 12 is incident on the optical fiber 100 as parallel light beam. In particular, it is preferred that the convex lens 13 is formed on the optical device 12 by molding a translucent insulating resin at the top of the post 21, and the post has an insulating protective layer 19 formed by coating the translucent insulating resin on a side wall of the post, at which a wiring pattern described later extends to make an electrical connection between the optical device 12 and the electrical circuit 14.

Figure 4:
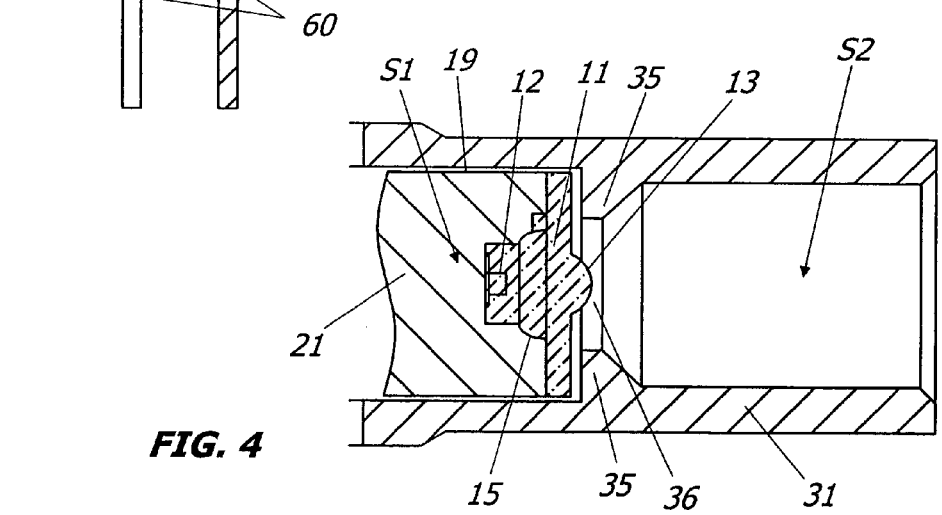
FIG. 4 is a magnified cross-sectional view of a part of FIG. 3.

As shown in FIG. 4, a side of the recess 22 is of a curved surface, on which a metal plating layer is formed as a reflection layer 15 for preventing a scattering of light. That is, the reflection layer 15 for the first photoelectric conversion module reflects the light provided from the optical fiber 100, so that the reflected light is incident on the light-receiving diode (PD) of the optical device 12. On the other hand, the reflection layer 15 for the second photoelectric conversion module reflects the light provided from the light-emitting diode (LED) of the optical device 12, so that the reflected light is incident on the optical fiber 100. Thus, since the reflection layer 15 prevents the scattering of light, it is possible to reduce coupling loss.

Figure 5:
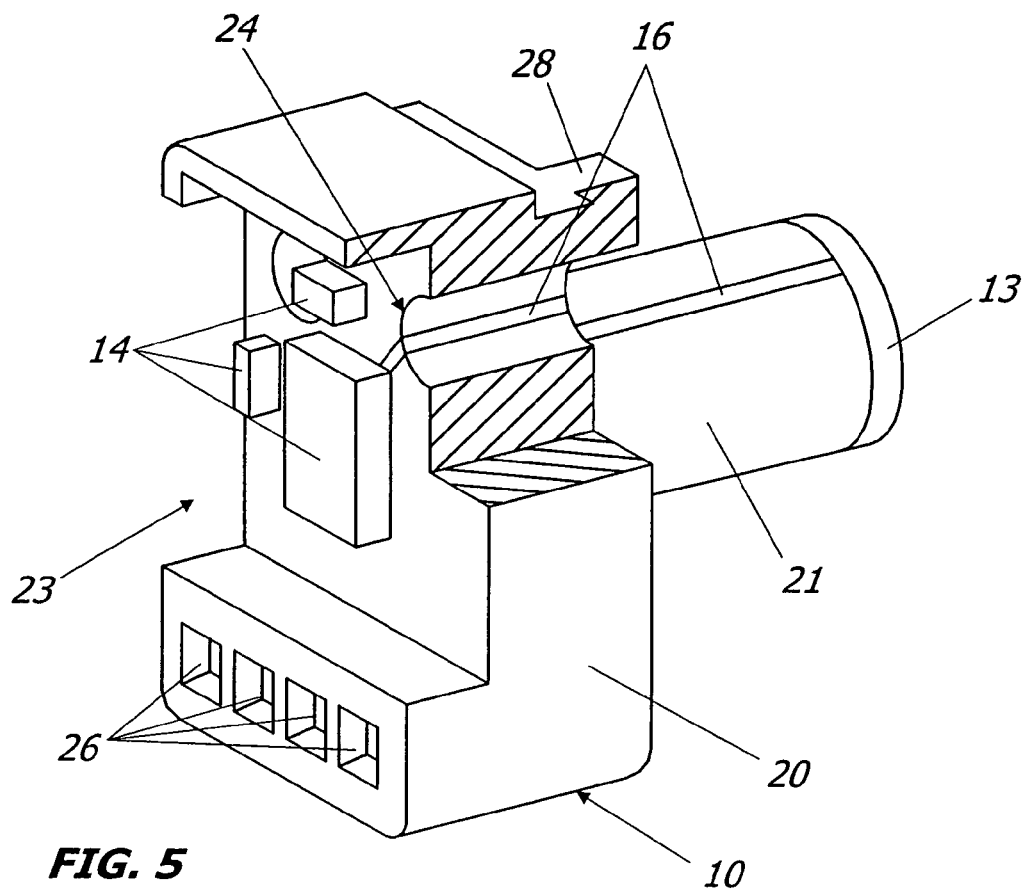
FIG. 5 is an elevational view partly in section of the photoelectric conversion module.

As shown in FIG. 5, the module body 20 is formed in a rear surface with a concave 23 for mounting the electrical circuit 14 on a bottom of the concave. In the case of the first photoelectric conversion module, the electrical circuit 14 comprises an integrated circuit, in which an input circuit for receiving output signals of the light-receiving diode (PD) is formed, and circuit components such as chip capacitors. On the other hand, in the case of the second photoelectric conversion module, the electrical circuit 14 comprises an integrated circuit, in which an output circuit for providing drive signals to the light-emitting diode (LED) is formed, and the circuit components such as chip capacitors.

The photoelectric conversion module 10 is a molded interconnect device (MID) that the wiring pattern 16 for making the electrical connection between the optical device 12 and the electrical circuit 14 is formed along an exterior surface of the module body 20.

In this embodiment, as shown in FIG. 5, the module body 20 has a through hole 24 extending between a position adjacent to the post 21 on the front surface of the module body and a position close to the electrical circuit 14 mounted in the concave 23. A metal plating layer is formed as the wiring pattern 24 along a side of the post 21 and an interior surface of the through hole 24 such that the optical device 12 mounted on the top of the post is electrically connected to the electrical circuit 14. In addition, after mounting the electrical circuit 14, and forming the wiring pattern 24, a sealing resin 25 is filled in the concave 23 of the module body 20.

Figure 6:
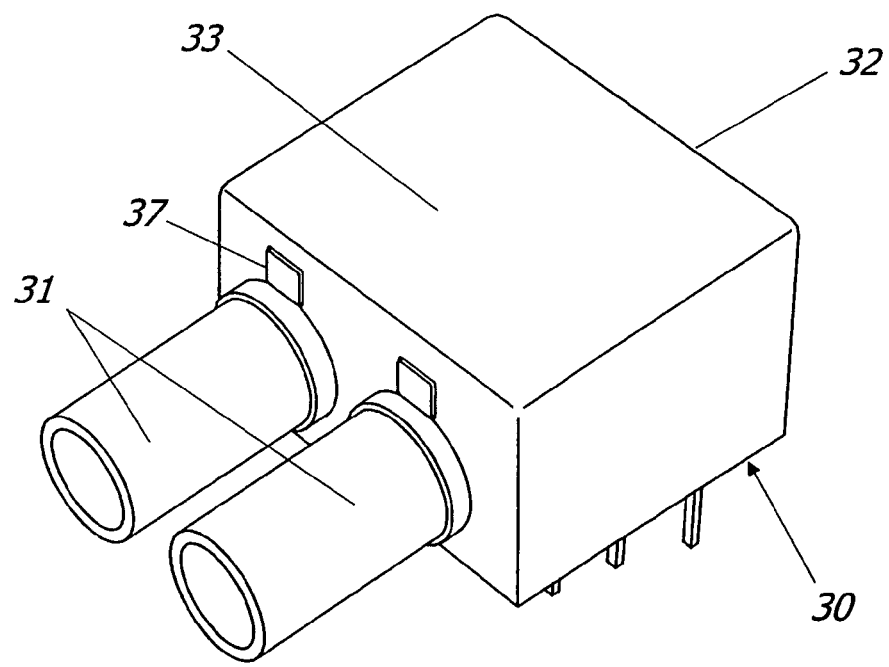
FIG. 6 is a perspective view of the module housing.

As shown in FIG. 6, the module housing 30 is a resin molded article having a pair of tubular projections 31 integrally formed on its front surface, into which one end of the optical fibers 100 of the optical plug 2 can be inserted, a rear opening 32, through which the photoelectric conversion modules 10 are accommodated in the module housing, and a shield layer 33 formed on its exterior surface by metal plating.

Figure 7:
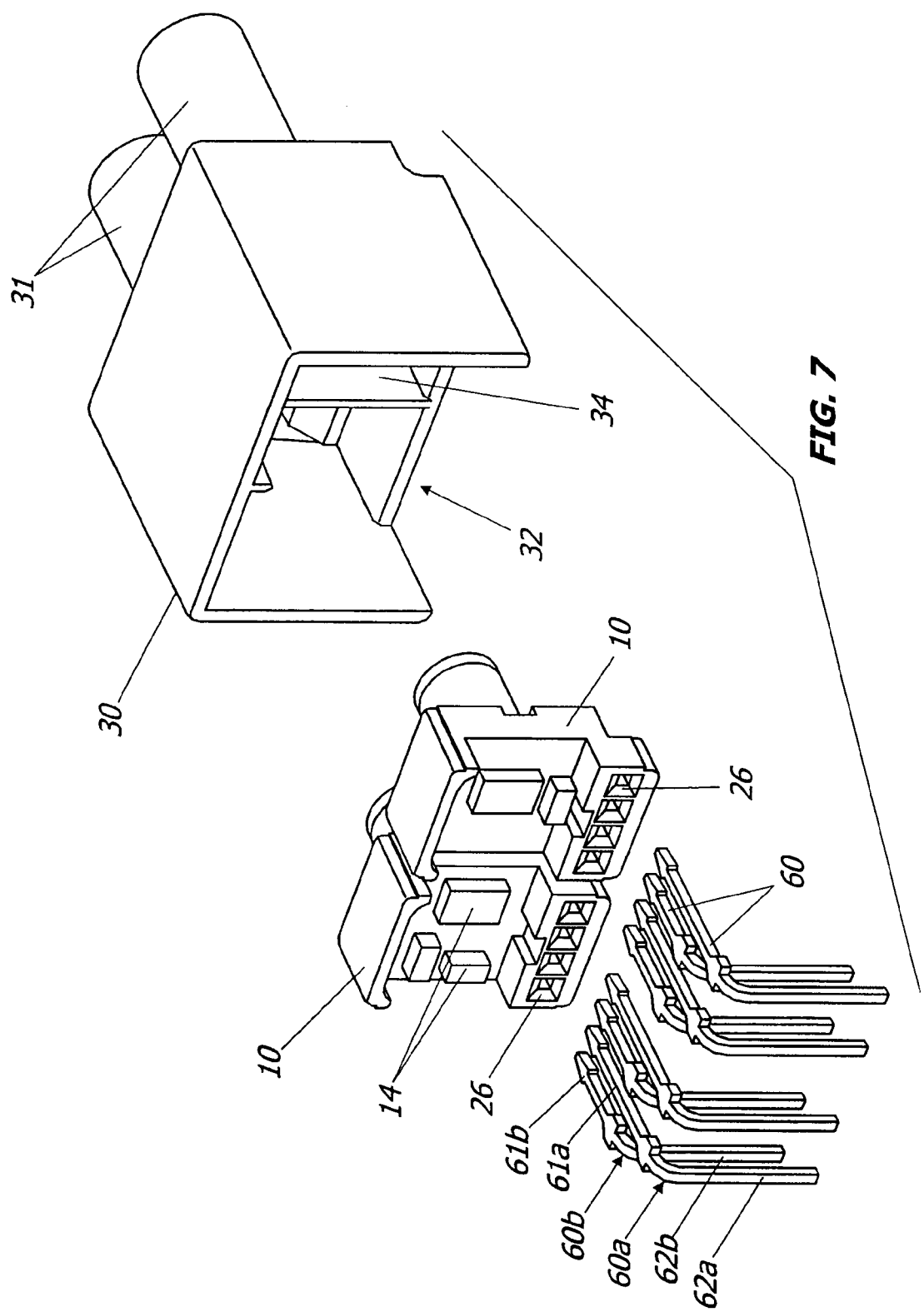
FIG. 7 is an exploded rear perspective view of a photoelectric conversion module.

In addition, as shown in FIG. 7, the module housing 30 has a separation wall 34 therein, by which a first room used to accommodate one of the photoelectric conversion modules 10 therein is spaced from a second room for accommodating the other photoelectric conversion module 10 therein. The first and second rooms are respectively communicated with interior spaces of the tubular projections 31.

In the tubular projections 31, a partition wall 35 having a center aperture 36 is formed such that an optical-fiber receiving space "S2" defined at one side (right side of FIG. 4) of the partition wall 35 to receive the end of the optical fiber 100 supported by the optical plug 2 is communicated with a post receiving space "S1" defined at the opposite side (left side of FIG. 4) of the partition wall 35 to receive the post 21 of the module body 20 through the center aperture 36.

Figure 8:
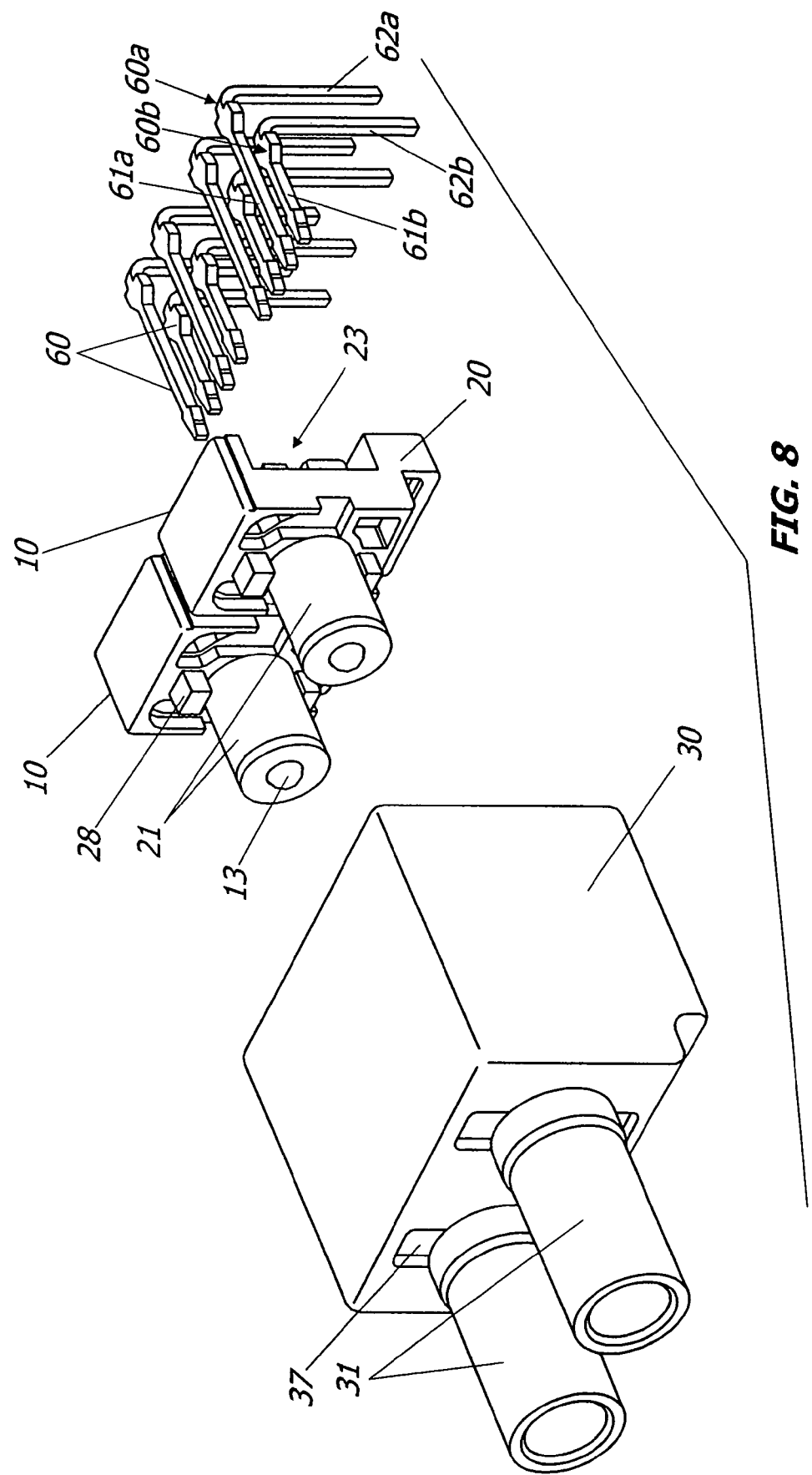
FIG. 8 is an exploded front perspective view of the photoelectric conversion module.

Each of the photoelectric conversion modules 10 can be accommodated in the module housing 30 according to the following procedure. First, as shown in FIGS. 7 and 8, a plurality of L-shaped terminal pins 60 are attached to terminal holes 26 formed in the rear surface of the module body 20. That is, when one end of each of the terminal pins 60 are pushed in the terminal hole 26, the terminal pin is electrically connected to a wiring 17 formed on the module body 20 by metal plating to make an electrical connection between an interior surface in the terminal hole 26 and the electrical circuit 14 mounted on the module body 20.

Figure 9:
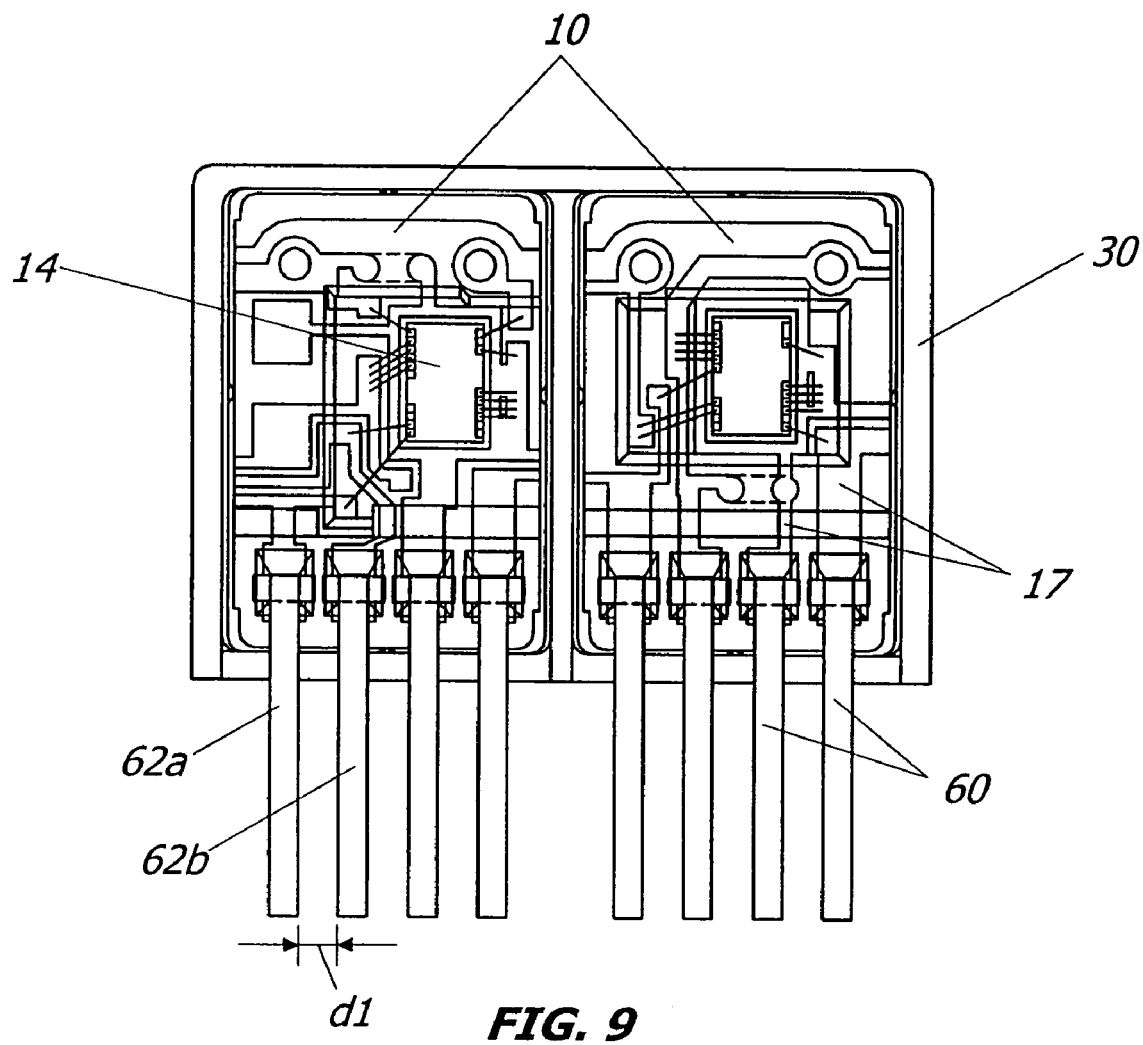
FIG. 9 is a rear plan view of the photoelectric conversion module.
Figure 10:
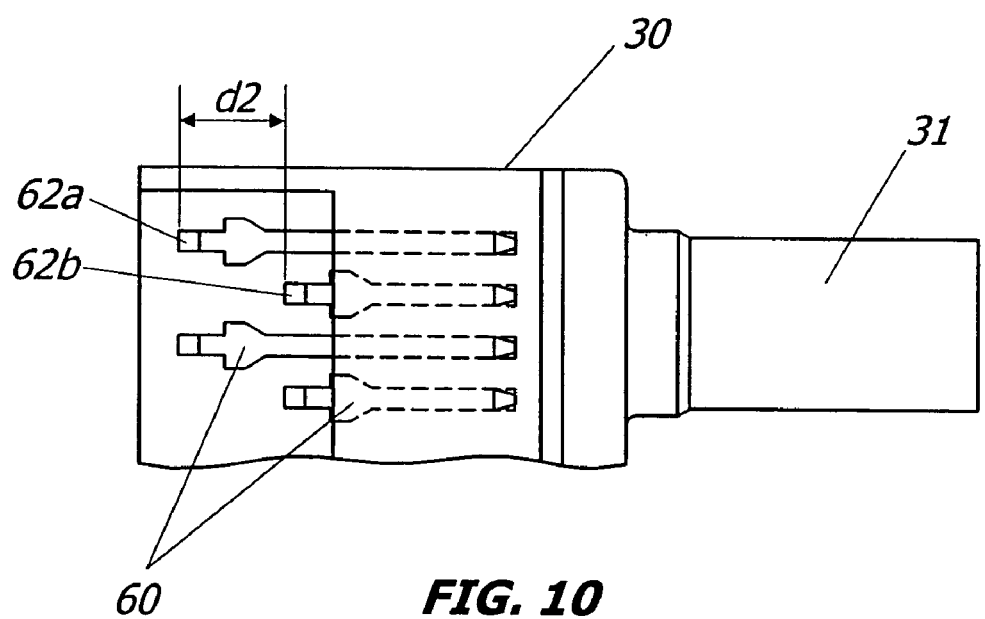
FIG. 10 is a partially bottom plan view of the photoelectric conversion module.

In this embodiment, two kinds of L-shape terminal pins (60a, 60b) having long and short arms (61a, 61b) are staggered in the direction of arrangement of the terminal holes 26. That is, when all of the terminal pins are pushed in the terminal holes, legs (62a, 62b) of the terminal pins are spaced away from each other by a distance "d1" in the transverse direction of the module body 20, as shown in FIG. 9, and also each of the legs (62a, 62b) are spaced away from the adjacent leg by a distance "d2" in the forward and backward direction of the module body 20, as shown in FIG. 10.

Figure 11:
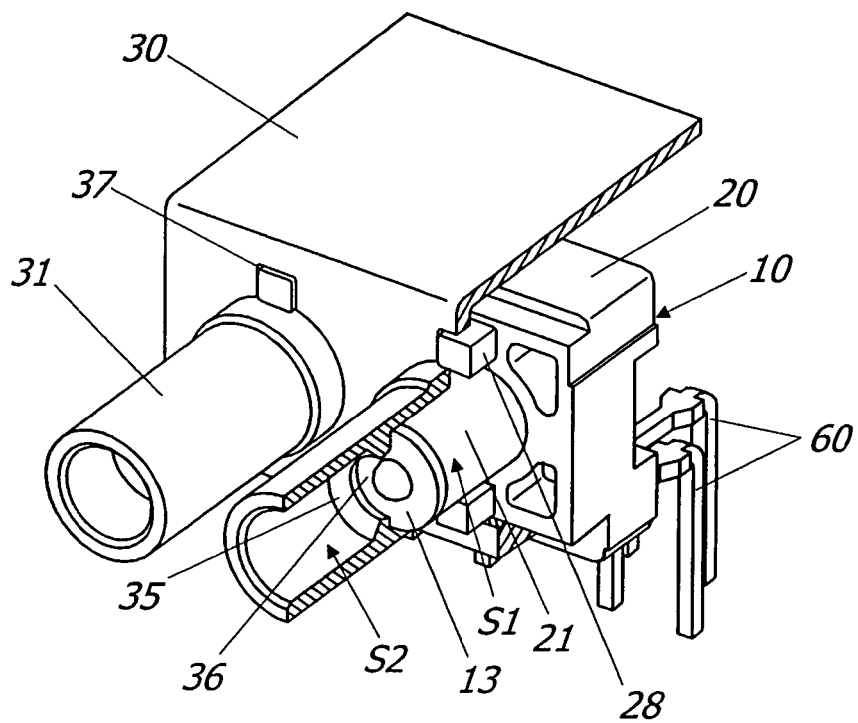
FIG. 11 is an elevational view partly in section of the photoelectric conversion module accommodated in the module housing.

After fixing the terminal pins 60 to the module body 20, the photoelectric conversion modules 10 are placed in the module housing 30 through the rear opening 32 such that the post 21 of the module body is accommodated in the post receiving space "S1" in the tubular projection 31 of the module housing, and the side surface of the post 21 fits the interior surface of the tubular projection 31, as shown in FIG. 11. At this time, a lens 13 is placed between the partition wall 35 of the module housing 30 and the post 21 having the optical device 12, as shown in FIGS. 3 and 4. In other words, the top of the post abuts against a side surface of the partition wall 35 through the lens 13, and a convex portion of the lens 13 projects into the center aperture 36 of the partition wall.

After accommodating the photoelectric conversion modules 10 in the module housing 30, a sealing resin 27 is filled in the module housing, as shown in FIG. 3. In FIG. 3, the numeral 28 designates a locating tab formed adjacent to the post 21 on a front surface of the module body 20. By fitting the locating tab 28 into a locating slot 37 formed in the module housing 30, it is possible to accurately accommodate the photoelectric conversion module 10 at a desired position in the module housing 30.

Figure 12:
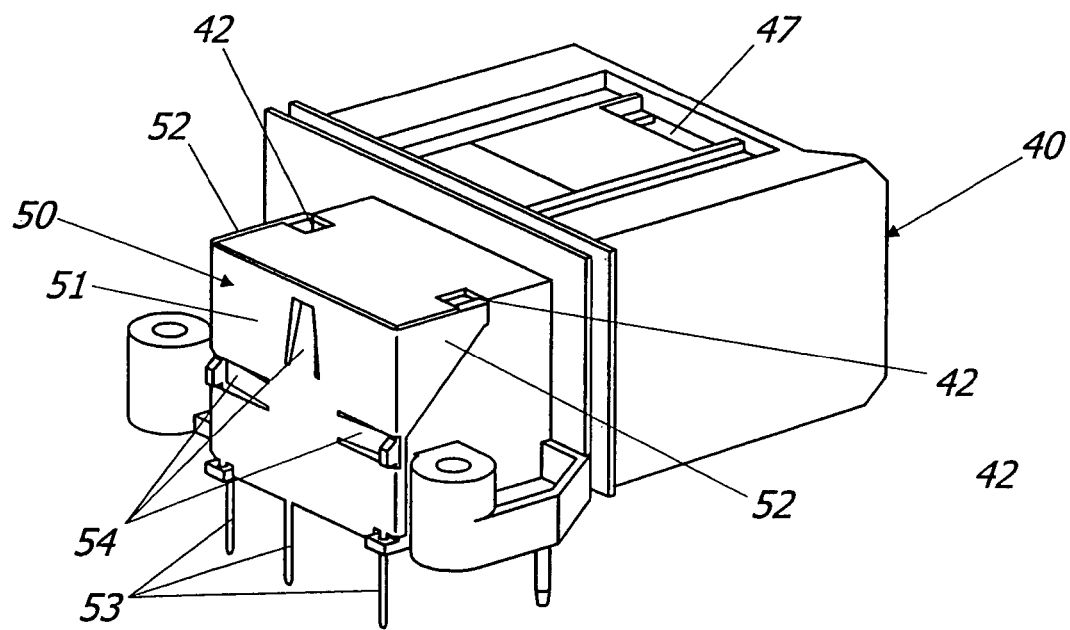
FIG. 12 is a perspective view of a receptacle housing with an electromagnetic interference shielding member.
Figure 13:
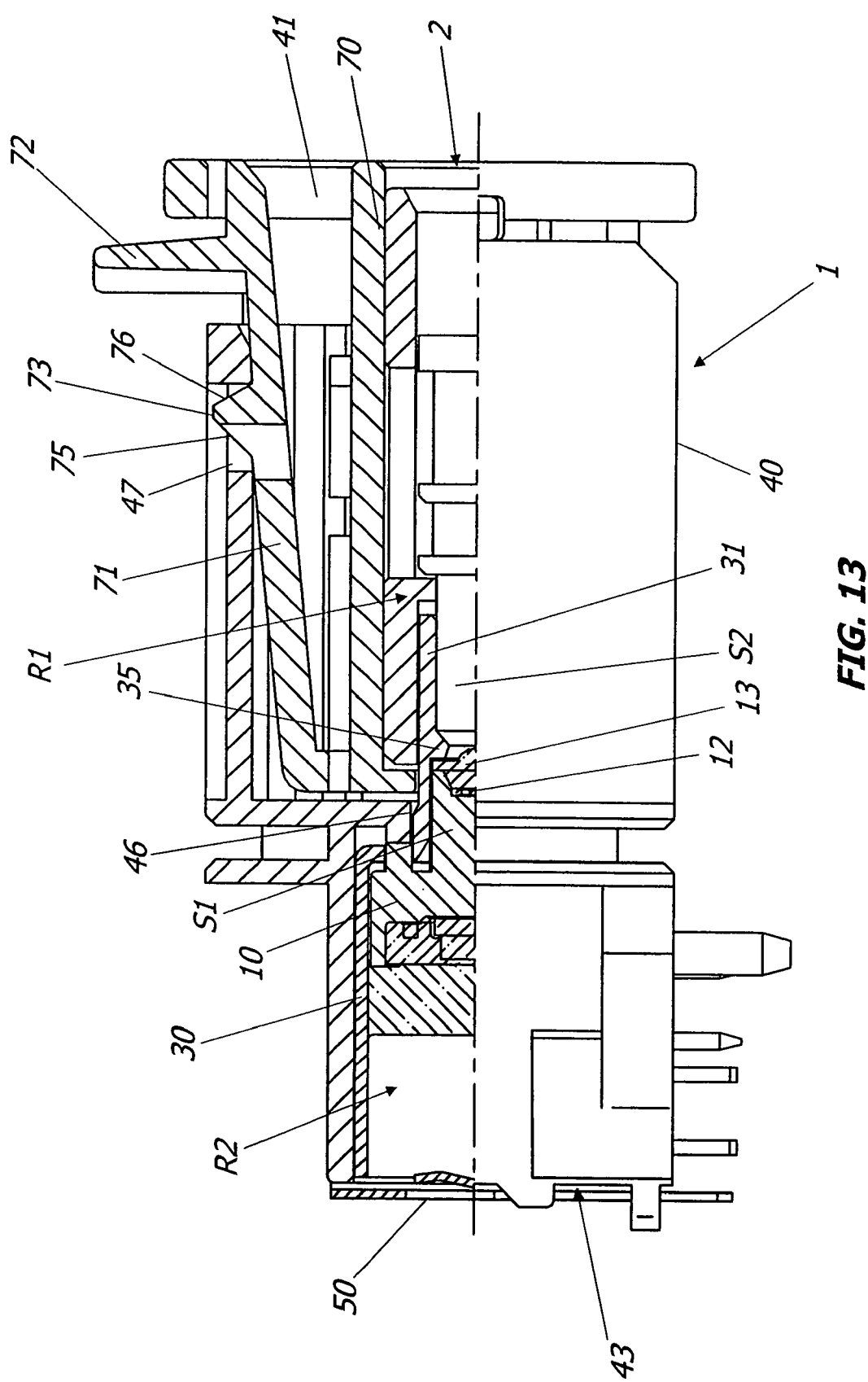
FIG. 13 is a partially cross-sectional view of the optical receptacle of the present. embodiment.

As shown in FIGS. 12 and 13, the receptacle housing 40 is a molded article of synthetic resin, which has a front opening 41, through which the optical plug 2 can be inserted into a plug accommodation room R1 defined in the receptacle housing, a rear opening 43, through which the photoelectric conversion modules 10 are accommodated in a module accommodating room R2 defined in the receptacle housing such that the tubular projections 31 of the module housing 30 projects in the plug accommodation space. R1. The rear opening 43 is closed by the electromagnetic interference shielding member 50.

The shielding member 50 can be formed by punching and bending a metal sheet, which is composed of a cover plate 51 having a rectangular shape, a pair of claws 52 extending forwardly from both sides of the cover plate, three earth terminals 53 extending downwardly from the bottom end of the cover plate, and three contact segments 54 formed in the cover plate. In FIG. 13, the numeral 46 designates a pair of through holes formed in the receptacle housing 40, into which the tubular projections 31 of the module housing 30 can be inserted, and the numeral 47 designates an engaging slot formed adjacent to the front opening 41 in the top surface of the receptacle housing.

The module housing 30 having the photoelectric conversion modules 10 therein can be accommodated in the receptacle housing 40 according to the following procedure. First, as shown in FIG. 14A, the module housing 30 is placed in the module accommodating room R2 of the receptacle housing such that the tubular projections 31 project into the plug accommodating room R1 through the through holes 46 of the receptacle housing 40. At this time, each of the L-shaped terminal pins 60 supported by the module body 20 is fitted into a groove 48 formed in a bottom wall of the receptacle housing 40, as shown in FIG. 14B.

Next, the shielding member 50 is secured to the receptacle housing 40 by fitting the claws 52 in a pair of engaging holes 42 formed in the top surface of the receptacle housing, as shown in FIG. 14C, while putting a pair of pins 56 formed on the bottom end of the cover plate 51 of the shielding member 50 in pockets 49 formed at the vicinity of the rear opening 43 of the receptacle housing 40, as shown in FIG. 14D. At this time, the contact segments 54 of the shielding member 50 contact the shield layer 33 formed on the exterior surface of the module housing 30. Therefore, when the shielding member 50 is connected to ground through the earth terminals 53, it is possible to connect the shield layer 33 to the ground through the shielding member 50. In addition, since each of the contact segments 54 is pressed against the shield layer 33 on the module housing 30 by its spring force, it is possible to achieve a reliable contact between the shielding member 50 and the shield layer 33. Moreover, since the photoelectric conversion modules 10 are prevented from electromagnetic interference by the presence of the shielding member 50 and the shield layer 33, excellent resistance to noise is obtained.

Thus, the shielding member 50 closes the rear opening 43 of the receptacle housing 40 to prevent a fall of the photoelectric conversion modules 10 from the receptacle housing, and also function as the electromagnetic interference shielding means in cooperation with the shield layer 33 formed on the module body 30. Therefore, there are advantages of reducing total component counts of the optical receptacle 1, and downsizing the optical receptacle as whole, as compared with the case of separately forming a cover for closing the rear opening of the receptacle housing and a shielding member for protecting the photoelectric conversion modules from the electromagnetic interference.

Next, the optical plug 2 connectable with the optical receptacle 1 of the present embodiment is explained. In this embodiment, shape and size of an engaging portion of the optical plug 2 with the optical receptacle 1 are determined according to the "MOST®" standard.

The optical plug 2 is a resin molded article, and is formed with a plug body 70 having a shape that can be fitted the front opening 41 of the receptacle housing 40. The pair of optical fibers 100 are supported in parallel in the plug body 70. The plug body has an engagement lever 71 on its top surface, which is used to lock or release the engagement between the optical receptacle 1 and the optical plug 2. One end of the engagement lever 71 is connected to the plug body 70, and a release tab 72 is formed at the vicinity of an opposite free end of the engagement lever. When pushing down the release tab 72, the engagement lever 71 can be elastically deformed. The engagement lever 71 also has a pair of knobs 73 formed adjacent to the release tab 72, which can be engaged in the engaging slot 47 of the receptacle housing 40.

When the optical plug 2 is connected to the optical receptacle 1, the top ends of the pair of optical fibers 100 are inserted into the optical-fiber receiving space "S2" of the tubular projections 31 of the module housing 30. At this time, since the top end of each of the optical fibers 100 abuts against the side surface of the partition wall 35 in the tubular projection 31, the partition wall can prevent the occurrence of an accidental interference between the optical fiber 100 and the optical device 12. In addition, the partition wall functions as a stopper for inserting the optical fiber at a required depth in the tubular projection 31 with good repeatability. For example, when the partition wall 35 is not formed in the tubular projection 31, the distance (gap) between the top end of the inserted optical fiber 100 and the optical device 12 fluctuates in a range of about 1.5 mm. On the other hand, when the partition wall 35 is formed in the tubular projection, the distance therebetween fluctuates in a smaller range of about 0.7 mm. This result suggests that the formation of the partition wall 35 is effective to more stably provide optical data communication with low transmission loss. Thus, the optical receptacle 1 having the partition wall 35 corresponds to one of particularly preferred embodiments of the present invention.

By the way, as described above, when the optical plug 2 is connected to the optical receptacle 1, the top end of each of the optical fibers 100 abuts against the side surface of the partition wall 35, and the post 21 of the module body 20 abuts against the opposite side surface of the partition wall 35 through the lens 13. This means that the top end of the inserted optical fiber 100 is positioned in a closely opposing relation to the optical device 12 mounted on the post 21 in the tubular housing 31. Therefore, in the present invention, since it is not necessary to arrange an additional optical fiber or an additional part such as sleeve between the optical device 12 and the optical fiber 100 supported by the optical plug 2, the distance (gap) therebetween becomes smaller, so that a considerable reduction in transmission loss can be achieved.

When the optical plug 2 is connected to the optical receptacle 1, the knobs 73 formed on the engagement lever 71 fit in the engaging slot 47 of the receptacle housing 40 to lock the connection between the optical plug and the optical receptacle. To improve easiness of locking the connection therebetween, it is preferred that each of the knobs 73 has a first inclined surface 75 for smoothly guiding the knobs into the engaging slot 47, as shown in FIG. 13. On the other hand, the connection between the optical plug 2 and the optical receptacle 1 can be released by pulling out the optical plug from the plug accommodation room R1 in the receptacle housing 40, while pushing down the release tab 72 to remove the knobs 73 from the engaging slot 47. To improve easiness of releasing the connection therebetween, it is preferred that each of the knobs 73 has a second inclined surface 76 formed at the opposite side of the first inclined surface 75 to smoothly guide the knobs from the engaging slot 47 to the outside, as shown in FIG. 12.

Figure 15:
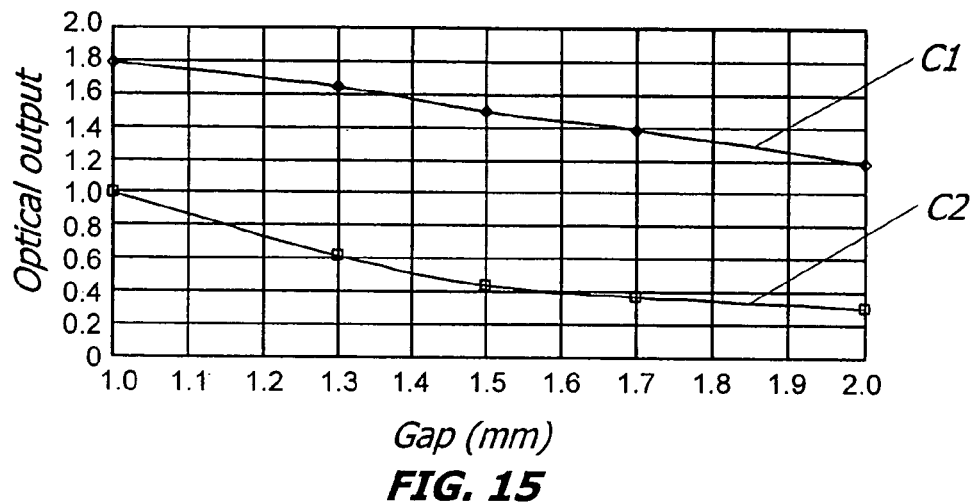
FIG. 15 is a graph showing an influence of the presence or absence of a lens and a reflection layer in the optical receptacle over transmission loss.

Next, simulation results of evaluating an influence of the presence or absence of the lens 13 and reflection layer 15 of the optical receptacle 1 over an amount of optical output supplied from the optical device 12, i.e., the light-emitting diode (LED) to the optical fiber 100 are explained. That is, the simulation results of FIG. 15 were obtained by measuring relationships between an optical amount received by the optical fiber 100 and a distance (gap) between the light-emitting diode (LED) and the end surface of the optical fiber 100 under a condition that an optical output from the light-emitting diode (LED) is constant. In FIG. 15, the curve "C1" corresponds to the simulation results obtained by use of the optical receptacle 1 having the lens 13 and the reflection layer 15, and the curve "C2" corresponds to the simulation results obtained by use of the optical receptacle not having the lens and the reflection layer.

In the simulation results of FIG. 15, when the optical receptacle not having the lens and reflection layer is used, and the gap is 1 mm, the optical amount received by the optical fiber 100 is 1. On the other hand, when the optical receptacle having the lens 13 and reflection layer 15 is used, and the gap is 1 mm, the optical amount received by the optical fiber 100 is 1.8, which is much larger than the case of using the optical receptacle not having the lens and reflection layer.

Moreover, in the case of using the optical receptacle not having the lens and reflection layer, as the gap increases from 1 mm to 1.3 mm, the optical amount received by the optical fiber 100 reduces from 1 to 0.6. This means that the optical amount received by the optical fiber 100 reduces by 40% on the change in the gap. On the other hand, in the case of using the optical receptacle 1 having the lens 13 and reflection layer 15, as the gap increases from 1 mm to 1.3 mm, the optical amount received by the optical fiber 100 reduces from 1.8 to 1.65. This means that the optical amount received by the optical fiber 100 reduces by only 8% on the change in the gap.

These simulation results mean that the formation of the lens 13 and reflection layer 15 is effective to minimizing the transmission loss and further increase the optical amount received by the optical fiber 100. Therefore, the optical receptacle 1 having the lens 13 and the reflection layer 15 corresponds to one of particularly preferred embodiments of the present invention.

Figure 16:
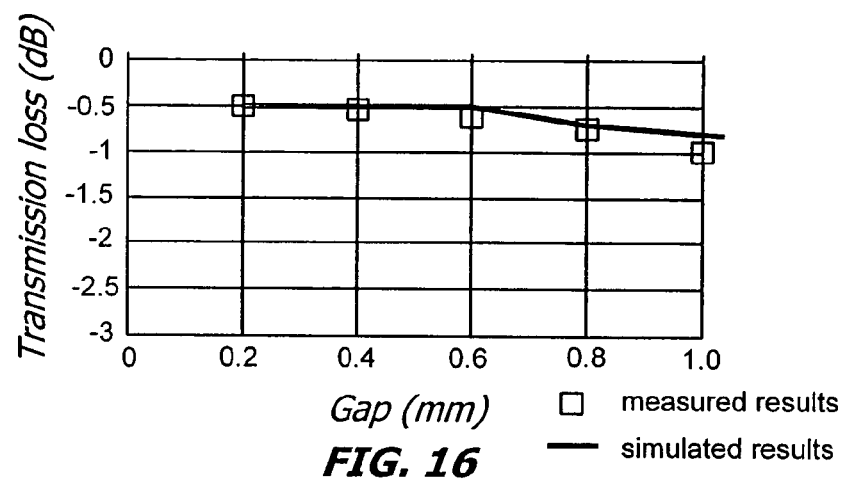
FIG. 16 is a graph showing a correspondence between simulation results and actually measured results with regard to the transmission loss.

FIG. 16 is a graph showing relationships between the transmission loss and the distance (gap) between the optical device 12 and the end surface of the optical fiber 100. In this graph, the solid line corresponds to simulation results, and rectangular dots "□" correspond to actually measured results. The simulation results are in good agreement with the measured results.

Figure 17:
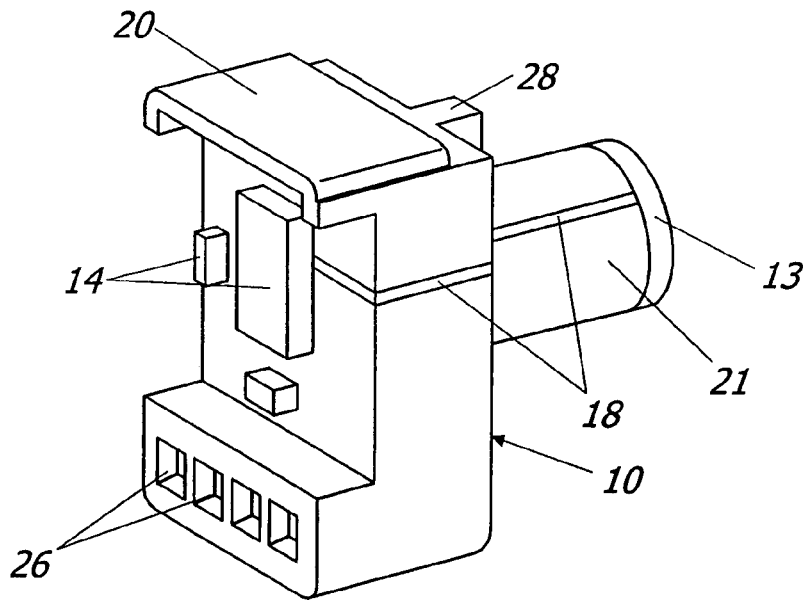
FIG. 17 is a perspective view of the photoelectric conversion module according to a modification of the above embodiment.
Figure 18:
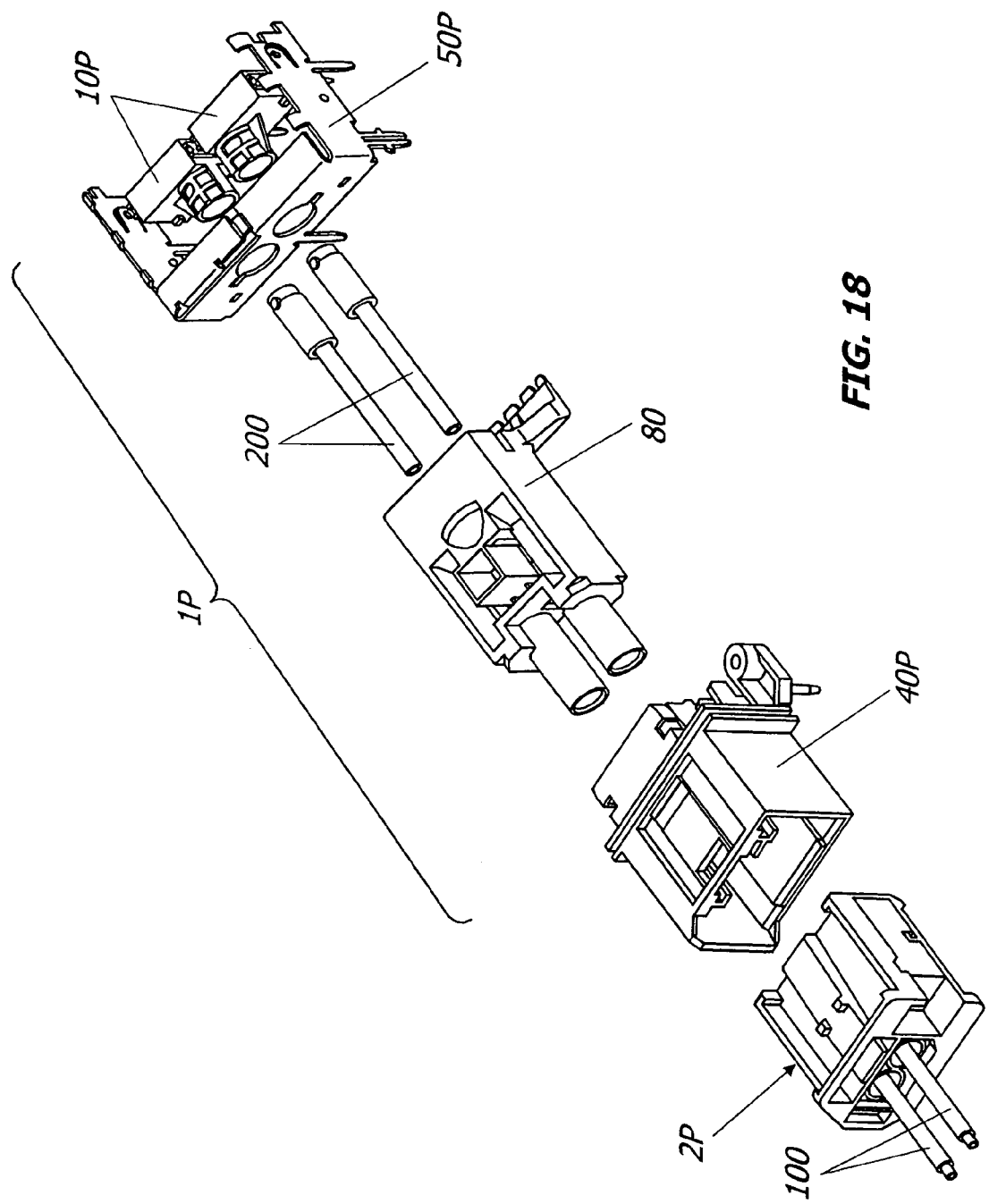
FIG. 18 is an exploded perspective view of a conventional optical receptacle.
Figure 19:
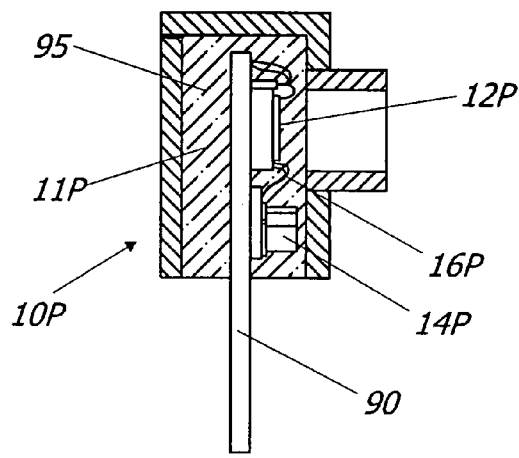
FIG. 19 is a cross-sectional view of a photoelectric conversion module of the optical receptacle of FIG. 18.
Figure 20:
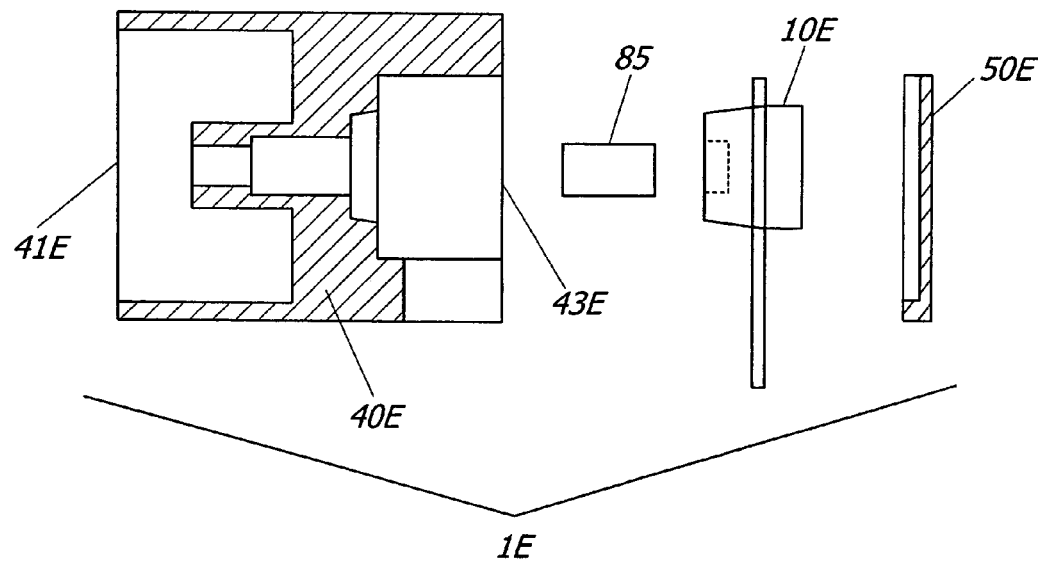
FIG. 20 is an exploded perspective view of another conventional optical receptacle.

As a modification of the above embodiment, in place of the wiring pattern 16 shown in FIG. 5, another wiring pattern 18 may be formed on the side of the post 21, the front, side and rear surfaces of the module body 20 by metal plating, as shown in FIG. 17, to electrically connect the optical device 12 to the electrical circuit 14 mounted on the module body 20 without forming the through hole 24 in the module body.

As a further modification of the above embodiment, in place of forming the locating tab 28 of the module body 20, the positioning of the module body in the module housing 30 may be performed by appropriately designing a clearance between the interior surface of the tubular projection 31 and the exterior surface of the post 21 of the module body 20, or a clearance between the interior surface of the module housing 30 and the exterior surface of the module body 20. In this case, since the module housing 30 not having the locating slots 37 is provided, it is possible to further improve the electromagnetic interference shielding effect of the module housing.

INDUSTRIAL APPLICABILITY

As understood from the above explanation, since it is not necessary to arrange an additional optical fiber or an additional part such as sleeve between the optical device and the optical fiber supported by the optical plug, the optical receptacle of the present invention can provide a low transmission loss by minimizing a distance (gap) between the top end of the optical fiber supported by the optical plug and the optical device when the optical receptacle is connected to the optical plug. In addition, since the electrical circuits such as integrated circuits and circuit components are mounted on the rear surface of the module body, and the optical device is mounted to the post formed on the front surface of the module body, there is an advantage that the optical receptacle can be readily assembled. Moreover, when the photoelectric conversion module is surrounded with the shield layer formed on the exterior surface the module body and the electromagnetic interference shielding member, it is possible to effectively prevent the photoelectric conversion module from the electromagnetic interference and provide excellent resistance to noise.

Therefore, the optical receptacle of the present invention having the capability of achieving the above-described advantages will be widely useful in the technical field of a high-speed optical communication, and preferably used for various transport means such as automobiles, airplanes, trains and shipping.

The invention claimed is:

1. An optical receptacle connectable with an optical plug having an optical transmission medium, said optical receptacle comprising a photoelectric conversion module having the capability of making photoelectric conversion between light signals transmitted through said optical transmission medium and electrical signals, and a module housing for accommodating said photoelectric conversion module therein, wherein said module housing is formed with a tubular projection, into which one end of said optical transmission medium can be inserted, and said photoelectric conversion module comprises an optical device disposed in a closely opposing relation to the one end of said optical transmission medium in said tubular projection when said optical plug is connected with said optical receptacle, and an electrical circuit electrically connected to said optical device.

2. The optical receptacle as set forth in claim 1, wherein said photoelectric conversion module comprises a module body having a post, on a top of which said optical device is mounted, and said electric circuit is mounted on said module body.

3. The optical receptacle as set forth in claim 2, wherein said post is formed in its top with a recess for mounting said optical device on a bottom of said recess, and a reflection layer for preventing a scattering of light is formed on a sidewall in said recess.

4. The optical receptacle as set forth in claim 2, wherein said photoelectric conversion module is a molded interconnect device that a wiring for making electrical connection between said optical device and said electrical circuit is formed along an exterior surface of said module body.

5. The optical receptacle as set forth in claim 2, wherein said photoelectric conversion module has a lens formed on said optical device by molding a translucent insulating resin at the top of said post, and an insulating protective layer obtained by coating said translucent insulating resin on a side wall of said post, at which a wiring pattern is formed to make an electrical connection between said optical device and said electrical circuit.

6. The optical receptacle as set forth in claim 1, further comprising a receptacle housing for accommodating said module housing therein, which is used for connection with said optical plug and has a front opening, through which said optical plug can be inserted into a plug accommodation space defined in said receptacle housing.

7. The optical receptacle as set forth in claim 6, wherein said receptacle housing has a rear opening, through which said photoelectric conversion module is accommodated in said receptacle housing such that said tubular projection of said module housing projects in said plug accommodation space, and said rear opening is closed by an electromagnetic interference shielding member.

8. The optical receptacle as set forth in claim 1, wherein said optical device is at least one of a light emitting element and a light receiving element.

9. The optical receptacle as set forth in claim 1, wherein said module housing has said tubular projection integrally formed on its front surface, a rear opening, through which said photoelectric conversion module is accommodated in said module housing, and a shield layer formed on its exterior surface.

10. The optical receptacle as set forth in claim 1, wherein said module housing has a stopper formed in said tubular projection, against which the one end of said optical transmission medium abuts when said optical plug is connected with said optical receptacle.

11. The optical receptacle as set forth in claim 1, further comprising a lens, which is positioned between said optical device and the one end of said optical transmission medium when said optical plug is connected with said optical receptacle.

12. An optical receptacle connectable with an optical plug having an optical transmission medium, said optical receptacle comprising a photoelectric conversion module having the capability of making photoelectric conversion between light signals transmitted through said optical transmission medium and electrical signals, and a module housing for accommodating said photoelectric conversion module therein, wherein said photoelectric conversion module comprises a module body having a post, an optical device mounted on a top of said post, and an electrical circuit mounted on said module body and electrically connected to said optical device, said module housing has a tubular projection, into which one end of said optical transmission medium can be inserted, and a partition wall is formed in said tubular projection, said photoelectric conversion module is accommodated in said module housing such that said post is positioned at a side of said partition wall in said tubular projection, and wherein when said optical plug is connected with said optical receptacle, the one end of said optical transmission medium is positioned at the opposite side of said partition wall in said tubular projection so as to be in a closely opposing relation to said optical device mounted on said post.

13. A photoelectric conversion module for an optical receptacle connectable with an optical plug having an optical transmission medium, said photoelectric conversion module having the capability of making photoelectric conversion between light signals transmitted through said optical transmission medium and electrical signals, and comprising a module body having a post, an optical device mounted on a top of said post, and an electrical circuit mounted on said module body and electrically connected to said optical device, wherein said photoelectric conversion module is a molded interconnect device that a wiring for making the electrical connection between said optical device and said electrical circuit is formed along an exterior surface of said module body, and said optical device mounted on said post is disposed in a closely opposing relation to one end of said optical transmission medium when said optical plug is connected with said optical receptacle.

* * * * *